United States Patent [19]

Steuer et al.

[11] 3,916,709
[45] Nov. 4, 1975

[54] LINK CHAIN

[75] Inventors: Herbert Steuer; Raimund Pataky, both of Bad Homburg vor der Hobe; Walter Ketterle, Oberursel, all of Germany

[73] Assignee: P.I.V. Antrieb Werner Reimers Kommanditgesellschaft, Bad Homburg vor der Hobe, Germany

[22] Filed: Oct. 30, 1974

[21] Appl. No.: 519,199

[30] Foreign Application Priority Data
Nov. 10, 1973    Germany............................ 2356289

[52] U.S. Cl................................. 74/253 R; 74/254
[51] Int. Cl.$^2$......................................... F16G 13/02
[58] Field of Search............... 74/253 R, 253 S, 254

[56] References Cited
UNITED STATES PATENTS

| 1,638,388 | 8/1927 | Belcher............................ 74/253 S |
| 3,353,421 | 11/1967 | Ketterle et al. ................ 74/253 R |
| 3,540,302 | 11/1970 | Bendall............................ 74/253 R |

FOREIGN PATENTS OR APPLICATIONS

| 217,323 | 9/1961 | Austria............................. 74/253 R |

Primary Examiner—Samuel Scott
Assistant Examiner—F. D. Shoemaker
Attorney, Agent, or Firm—Spencer & Kaye

[57] ABSTRACT

A link chain has a plurality of serially arranged links each formed of a stack of elongated link plates. Each link plate has two spaced, generally circular openings. A link pin formed of a pair of rockers extends through each opening of overlapping links for connecting them together. The rockers have arcuate surfaces rolling on one another and notches along their length. The notches extend in a direction transversal to the longitudinal orientation of the link plates. Between adjoining arcuate surfaces of the rockers forming each link pin there are provided two free spaces. At least one plate of each link is a locking plate that has two detents projecting into solely one of the openings of the locking plate from diametrically opposite locations. Each detent of each locking plate is situated in a notch of different rockers of the same link pin when the locking plate is in alignment with the other link plates of the same link; each detent of any one locking plate moves into one and the other free spaces between the rockers when the locking plate is pivoted about the rockers with respect to the remaining plates of that link.

6 Claims, 8 Drawing Figures

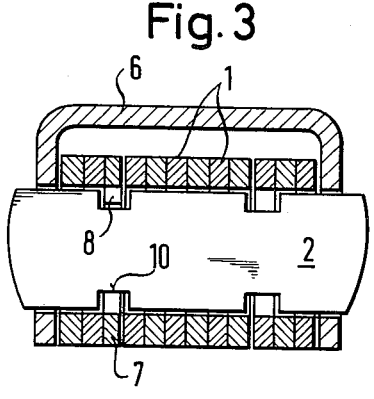
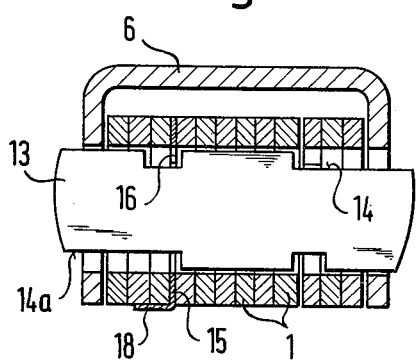
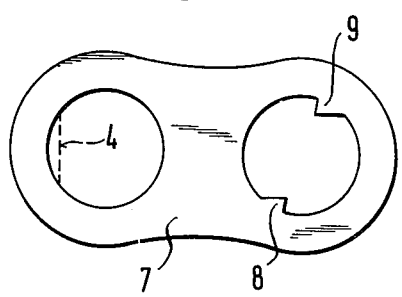
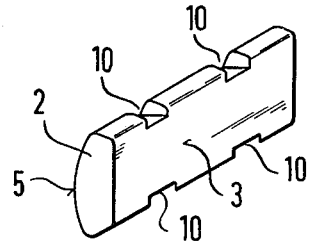
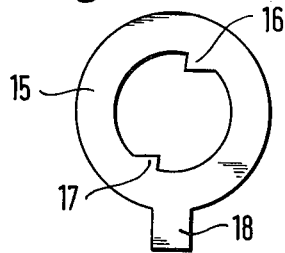
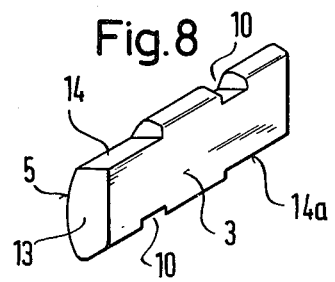

LINK CHAIN

BACKGROUND OF THE INVENTION

The invention relates to a link chain, particularly for steplessly variable cone pulley drives whose joint members, adapted to connect the individual links (each formed of a plurality of link plates), are constructed as pairs of rockers. The rockers are inserted into the link plate openings; the end faces of the rockers transmit the frictional forces between the friction pulleys and the chain and are connected to the plates associated with their links by means of a positive anti-pivot lock. At least one plate associated with each link and disposed between the outer plates of the chain is constructed as a locking element which is provided with detents engaging in rocker notches extending transversely to the longitudinal orientation of the locking element. No anti-pivot locking element is provided in addition to the noses for the rockers.

A chain of this kind is disclosed in U.S. Pat. No. 3,353,421. When this chain is assembled to form an endless structure, the rocker to be inserted last is retained by a locking element in the form of a thin circular disc into the central opening of which there projects a locking surface which can be brought into engagement with one of the notches of the rocker by pivoting the disc from a position permitting unobstructed insertion of the rocker into its operating position. The disc may be locked in the last-mentioned position to maintain engagement of the locking surface.

In a chain designed in the above-outlined manner the rockers are prevented from moving laterally out of the plate openings without weakening the rocker ends subjected to compressive forces and without the need for additional parts which would affect the dimensions of the chain. A tendency for the rockers to travel outwardly in the lateral direction may also be present if they are horizontally arranged. Such lateral displacement may be the result of additional forces, for example vibrations, which lead to a constant reciprocating motion of the rockers in the plate openings in conjunction with the subsequent realignment when the rockers run in between the friction pulleys. This may cause substantial wear. This applies particularly when the chain is used in such a manner that the rockers are not horizontally disposed. Further, safety means are required for assembling and shipping the chains because they are then not yet in a longitudinally prestressed state; consequently, the rockers could readily drop out of the plate openings.

In the chain of known structure, the rockers have to be individually inserted when the chain is assembled to ensure that the rockers can be locked against lateral displacement by pivoting the locking plate from a position permitting the insertion of the rockers into the position in alignment with the other plates of the appropriate link. This is due to the fact that the locking plates are provided in each of their openings with a detent for locking the rocker members which are to be inserted into the opening. Assembling the chain is therefore relatively cumbersome, so that this operation can be automated only with substantial expenditure for machinery. Consequently, this operation is normally performed manually.

SUMMARY OF THE INVENTION

It is therefore an object of the inventin to provide an improved chain of the kind described hereinbefore so that its construction is simplified and the number of operations to be performed during assembly is reduced to thus render the chain adapted for a fully automatic assembly with a comparatively simple and low-cost device.

This object and others to become apparent as the specification progresses, are accomplished by the invention, according to which, briefly stated, the locking plate is provided with two diametrically opposite detents in only one opening and the detents are arranged and dimensioned to that they are situated in the free spaces between the associated rocker pair when the locking plate is pivoted with respect to the remaining plates of its link.

The above arrangement enables the rocker pair to be inserted at once and in one operation if the locking plate is pivoted with respect to the normal plates of the appropriate link so that the rocker pair is locked against lateral displacement likewise in one operatin by pivoting back the locking plate.

To this end, it is advantageous that the notches of the rocker pair to be inserted for completing the assembly of the chain to form an endless structure are extended to the adjacent end face or are open from the said end face. It is therefore nevertheless possible to insert the said rocker pair although the locking plate is no longer pivotal. This provides security against lateral outward motion in only one direction. This solution is adequate for many applications if steps are taken to ensure that the rockers are positioned vertically upright, for example during transportation or when the chain is used so that the rockers bear against the detents of the locking plate under the action of gravity.

It is, however, simpler and advantageous for completing the assembly of the chain to obtain an endless chain structure, if the locking plate of the affected link is replaced by the conventional plate so that an additional locking element in the form of a thin circular disc is provided for the rocker pair which is to be inserted last. The disc has two diametrically opposite detents extending into the opening of the disc which can be moved from a position permitting unobstructed insertion of the rocker pair into its operating position to engage with notches of the rockers. The disc can be locked in the last-mentioned position to maintain such engagement. In this case the rockers are thus secured against sliding in both directions without impairing the insertion of the rockers in pairs. This also avoids the need for specially machined rockers with recesses extended to their end faces.

Further, taking into account that a transverse central arrangement of the locking plates and the corresponding longitudinal central arrangement of the notches on the rockers is not possible, since the locking plates cannot be accommodated so as to be in alignment with each other in the longitudinal orientation of the chain, it has been found convenient for the further simplification of assembly, to provide the notches of the rockers on both sides of their longitudinal middle and on both longitudinal edges so that it will be immaterial which end of the rockers is inserted into the plate openings first. The apparatus is then merely required to ensure that the rockers of each pair are positioned with their rocker surfaces bearing upon each other and that the end faces are correctly positioned if the length between them alters in the radial direction.

BRIEF DESCRIPTION OF THE DRAWINGS

FIG. 3 is a sectional view along line III—III of FIG. 2.

FIG. 4 is a sectional view along line IV—IV of FIG. 2.

FIG. 5 is a side elevational view of a component shown in FIG. 1.

FIG. 6 is a side elevational view of a component shown in FIG. 2.

FIG. 7 is a perspective view of a component shown in FIG. 1.

FIG. 8 is a perspective view of a modified embodiment of the component shown in FIG. 7.

DESCRIPTION OF THE PREFERRED EMBODIMENT

Figure 1:
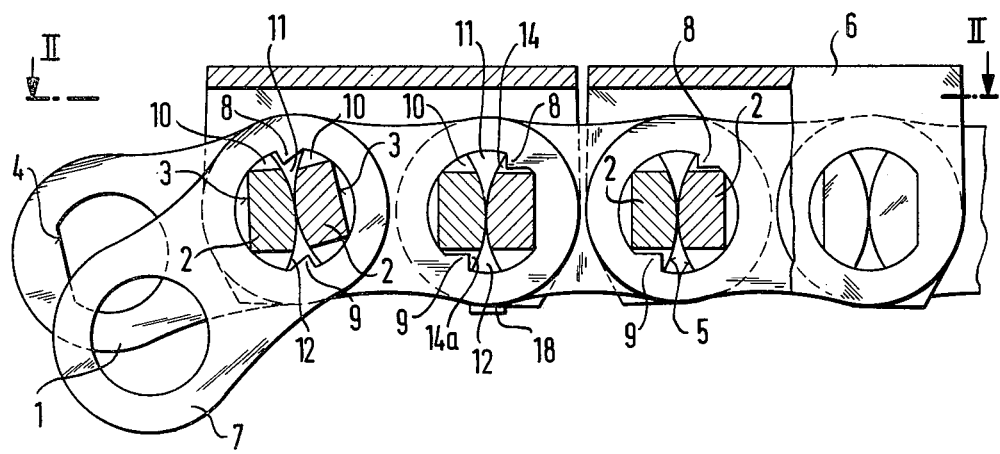
FIG. 1 is a partially sectional side elevational view of a preferred embodiment, taken along line I—I of FIG. 2.
Figure 2:
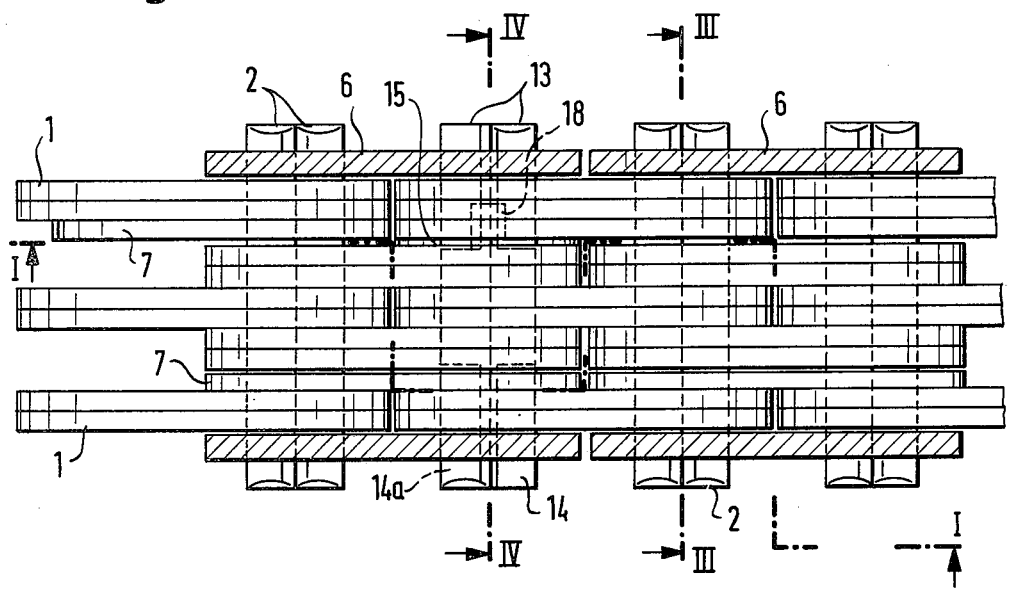
FIG. 2 is a partially sectional plan view of the same embodiment, taken along line II—II of FIG. 1.

The links of the chain illustrated in FIGS. 1 and 2 fundamentally comprise plates 1 which are jointed to each other by rockers 2 that are situated in pairs in generally circular openings of the plates 1. An anti-pivot lock is formed between the plates and the rockers of each link by means of a surface 3 of the rockers 2 and straight edges 4 corresponding therewith and associated with the plates 1 so that the rocker surfaces 5 roll upon each other when two links are pivoted with respect to one another. FIG. 1 shows only one straight edge 4 of the plate 1; the other bore of the said plate 1 is also provided with a straight edge 4, which is offset 180° with respect to the visible straight edge 4. The plate stacks forming each chain link are retained laterally by means of U-shaped yokes 6.

One plate 7 (see also FIG. 5) also serves as a locking element. For this purpose, two diametrically opposite detents 8 and 9 project into the area of one circular opening of the plate which has no edge 4. Each detent 8, 9 extends into separate notches 10 of the rockers 2 (see also FIG. 7) after assembly.

To assemble the chain, the locking plate 7 is pivoted with respect to the plates 1 of the associated link, as may be seen at the left-hand side of FIG. 1, so that the detents 8 and 9 are positioned within the free spaces 11 and 12 defined by the rockers 2 between their rocker surfaces 5. The pair comprising the rocker members 2 can then be inserted without obstruction into the plate opening. If the locking plate 7 is pivoted backwards, so that it is in alignment with the plates 1 associated with its link, the detents 8 and 9 will be simultaneously pivoted into the notches 10 of the rockers 2 so that the latter are secured against travelling laterally out of the plate opening.

For purposes of assembly, as may be seen on the left-hand side of FIG. 1, the plates 1 are slightly downwardly pivoted with respect to the stretched position of the chain. The reason for this is that in the special illustrated case the rockers are slightly asymmetrical over their height in the longitudinal orientation as well as transversely thereto for reasons not relevant here, so that the free spaces 11 and 12 bounded by the rocker surfaces 5 will be of equal magnitude if the plates 1 have the position shown in FIG. 1.

The yoke 6 which retains the plate stack of the link from the side is also mounted before the rocker pair is inserted. The yoke 6 participates in transmitting the tension forces.

For completing the assembly of the endless chain, i.e. when the last pair of rockers 13 (see also FIG. 8) is installed, there is no possibility of pivoting the locking plate associated therewith in the manner already described. In order to enable the last rocker pair to be installed, the latter are provided with recesses 14, 14a which are extended to their adjacent end face so that, proceeding from this end face, the rockers can be inserted towards the corresponding detent of the locking plate. This provides locking against lateral displacement in only one direction but this is adequate in many cases given appropriate arrangement or handling of the chain to prevent dropping out or sliding out of the rocker members 13. Regarding the illustration of the rocker member 13 in FIG. 8, it should be noted that the recesses 10 are not required. Their presence, however, does not interfere with a proper functioning of the chain, so that the rocker members 13 may be obtained by machining existing rocker members 2.

If, however, locking in both sliding directions is required even for the last pair of rockers 13 to prevent their accidental removal particularly during transportation, installation or the like, such locking can be achieved in a simple manner by providing a locking element 15 according to FIG. 6 in the form of a thin circular disc which is provided with two diametrically opposite detents 16 and 17 which are similar to the detents 8 and 9 of the locking plate 7. Such a relatively thin-walled locking disc can be readily accommodated without difficulty within the clearance between two adjacent plates 1.

For purpose of inserting the rockers 13, the locking disc 15 is pivoted counterclockwise (as viewed in FIGS. 1 and 6) to the same extent as the locking plate 7. After inserting the rocker pair, the locking plate 15 is pivoted back into the position illustrated in FIG. 6 in which each of its detents 16 and 17 engages into one of the rocker notches 10 which, as it is apparent, are required in this case. In order to facilitate this operation, the locking disc 15 is provided with a tab 18 which is bent over two adjoining plates 1 situated outwardly from the locking disc 15, so as to prevent the latter from pivoting, as it may be observed in FIG. 4.

In a modification not shown, the locking plate 7 is replaced by one of the normal plates 1 for the completion of the assembly of the endless chain in connection with the insertion of the last rocker pair. The locking disc 15 is also utilized in such a case. Rockers of the pair to be inserted last can then be constructed in accordance with FIG. 7, thus dispensing with the separate manufacture of rockers according to FIG. 8. The device for the automatic assembling of the chain is to be arranged in such a manner that it inserts a normal plate 1 instead of a locking plate 7 outside its normal cycle at the appropriate position. Considered in its entirety, such a solution is even simpler and less expensive than the additional manufacture of rockers 13 according to FIG. 8.

For the sake of completeness it should be added that the circular opening of the locking plates 7 according to FIG. 5 which does not contain detents 8 and 9, may be provided with a straight edge 4 similarly to the normal plates 1.

We claim:

1. In a link chain having a plurality of serially arranged links each formed of a stack of elongated link plates, each link plate having two spaced, generally circular openings; a link pin extending through each opening of overlapping links for connecting them together, each link pin being formed of a pair of rockers; the rockers having arcuate surfaces rolling on one another and means defining notches along their length, the notches extending in a direction transversal to the longitudinal orientation of the link plates; and two free spaces defined between adjoining arcuate surfaces of the rockers forming each link pin, the improvement wherein at least one plate of each link is a locking plate, said locking plate having two detents projecting into solely one of the openings of the locking plate from diametrically opposite locations of said solely one opening, each detent of each locking plate being situated in a notch of different rockers of the same link pin when the locking plate is in alignment with the other link plates of the same link, each detent of any one locking plate moving into one and the other free spaces between the rockers when the locking plate is pivoted about the rockers with respect to the remaining plates of said one link.

2. A link chain as defined in claim 1, wherein the rockers constituting one link pin inserted to render the chain endless, include end faces and means defining recesses in each rocker, said recesses being open in a direction viewed from said end faces.

3. A link chain as defined in claim 2, further including a disc having a central circular opening and inserted on said one link pin, said disc having two diametrically opposite detents projecting into said circular opening of said disc; said disc having a first angular position with respect to said one link pin for providing free movement of the rockers of said one link pin into and out of the associated plate openings without obstruction, said disc having a second angular position with respect to said one link pin, said detents of said disc extending into the notches of the rockers of said one link pin in said second angular position of said disc for locking the rockers of said one link pin in place.

4. A link chain as defined in claim 3, further comprising means for locking said disc in its said second angular position.

5. A link chain as defined in claim 1, wherein said notches are provided on said rockers on opposite longitudinal edges on both sides of their longitudinal middle.

6. In a link chain having a plurality of serially arranged links each formed of a stack of elongated link plates, each link plate having two spaced, generally circular openings; a link pin extending through each opening of overlapping links for connecting them together, each link pin being formed of a pair of rockers; the rockers having arcuate surfaces rolling on one another and means defining notches along their length, the notches extending in a direction transversal to the longitudinal orientation of the link plate; and two free spaces defined between adjoining arcuate surfaces of the rockers forming each link pin, the improvement comprising a disc having a central circular opening and inserted on one of the link pins, said disc having two diametrically opposite detents projecting into said circular opening of said disc; said disc having a first angular position with respect to said one link pin for providing free movement of the rockers of said one link pin into and out of the associated plate openings without obstruction, said disc having a second angular position with respect to said one link pin, said detents of said disc extending into the notches of the rockers of said one link pin in said second angular position of said disc for locking the rockers of said one link in place; at least one plate of every link other than the link associated with said one link pin is a locking plate, said locking plate having two detents projecting into solely one of the openings of the locking plate from diametrically opposite locations of said solely one opening, each detent of each locking plate being situated in a notch of different rockers of the same link pin when the locking plate is in alignment with the other link plates of the same link, each detent of any one locking plate moving into one and the other free spaces between the rockers when the locking plate is pivoted about the rockers with respect to the remaining plates of said one link.

* * * * *